No. 831,943. PATENTED SEPT. 25, 1906.
C. M. FREEMAN.
DENTAL HANDPIECE.
APPLICATION FILED JUNE 5, 1905.
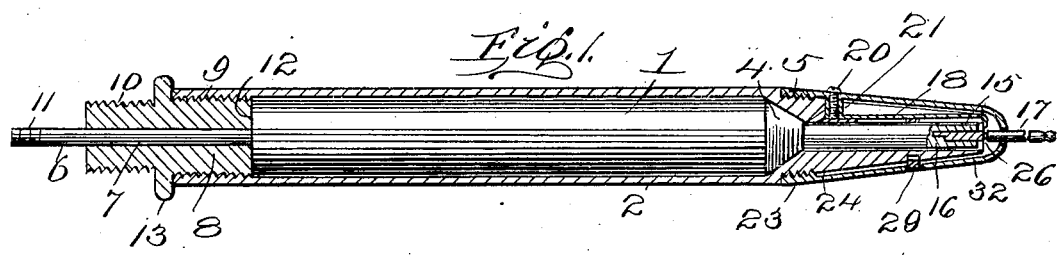
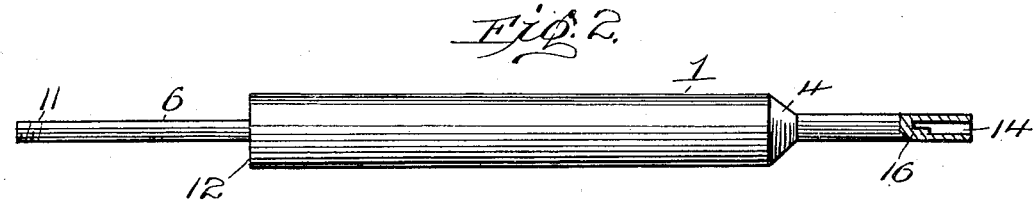
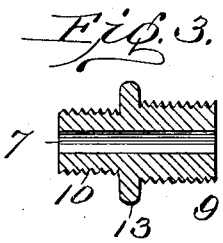
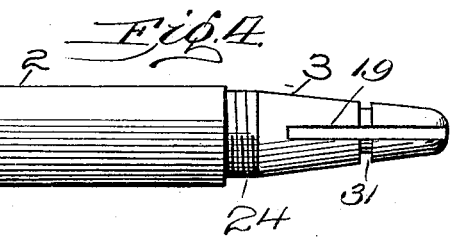
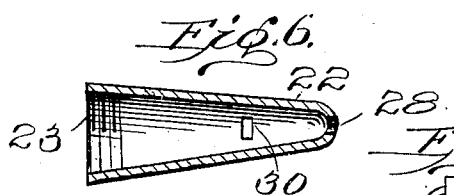
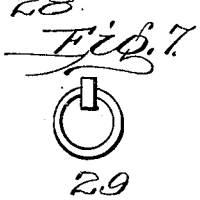
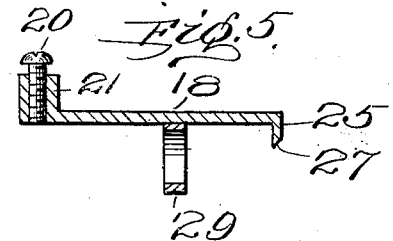
Witnesses
J. M. Fowler Jr.
Cassell Severance
Inventor
Chester M. Freeman,
By Mason Fenwick Lawrence
Attorneys.
THE NORRIS PETERS CO., WASHINGTON, D. C.

UNITED STATES PATENT OFFICE.

CHESTER M. FREEMAN, OF BROOKLINE, MASSACHUSETTS.

DENTAL HANDPIECE.

No. 831,943.      Specification of Letters Patent.      Patented Sept. 25, 1906.

Application filed June 5, 1905. Serial No. 263,843.

*To all whom it may concern:*

Be it known that I, CHESTER M. FREEMAN, a citizen of the United States, residing at Brookline, in the county of Norfolk and State of Massachusetts, have invented certain new and useful Improvements in Dental Handpieces; and I do hereby declare the following to be a full, clear, and exact description of the invention, such as will enable others skilled in the art to which it appertains to make and use the same.

This invention relates to improvements in handpieces for dental implements, and has particular relation to the means employed for securing burs or other dental tools to the means employed for operating such tool.

The invention consists in certain novel constructions, combinations, and arrangements of parts, as will be hereinafter more fully described and claimed.

In the accompanying drawings, Figure 1 is a longitudinal sectional view through a dental handpiece constructed in accordance with the present invention, portions of the mechanism being shown in side elevation. Fig. 2 is a side elevation of the actuating-spindle taken from its casing. Fig. 3 is a detail view of the connecting-thimble for joining the handpiece to the mechanism which carries it. Fig. 4 is a side elevation of the casing which receives the spindle, the removable end cap not being in place thereon. Fig. 5 is a detail view showing the tool-gripping spring. Fig. 6 is a detail sectional view of the removable cap for the end of the handpiece. Fig. 7 is a detail view, in end elevation, of the tool-retaining spring.

In the accompanying drawings I have illustrated a preferred form of my invention, in which 1 indicates an actuating-spindle, which is inclosed in a non-revoluble casing 2. The spindle finds a bearing in the outer casing at each end thereof, said casing being contracted at its outer end, as shown at 3 in the drawings. The outer end of the actuating-spindle 1 is reduced in size, so as to form an end-thrust bearing 4, which engages a corresponding socket-bearing 5, formed in the contracted portion of the casing. The inner end of the spindle is also reduced, as at 6, the reduced portion extending through a bearing 7, formed in a connecting-thimble 8. The thimble 8 is provided with threaded end portions, one of which engages internal threads, as at 9, in the end of the casing 2. The other threaded portion, 10, of the thimble is adapted for engagement with the usual flexible connector or tubing which leads to any suitable power mechanism or engine. The inner end of the reduced spindle portion 6 may also be threaded, as at 11, for connection with the power-transmitting member, which is connected with the engine or other source of power. The shoulder 12, formed near the inner end of the spindle 1 by the reduction in diameter of the said spindle, abuts against the inner end of the thimble 8, the said thimble forming one of the end-thrust bearings of the spindle, the other end-thrust bearing being formed at 4, as hereinbefore described. The thimble 8 is formed with a projecting annular flange 13, which is roughened or serrated upon its outer edge and extends sufficiently beyond the periphery of the casing 2 to permit the same to be readily grasped by the fingers of the operator for rotating it when assembling or separating the parts. The outer end of the spindle 1 is provided with a tool-receiving socket 14, which is formed with any suitable means therein for so engaging the tool 17 as to prevent rotation thereof within the socket—as, for instance, a shoulder 16 is arranged at the inner end of the socket 14—and the tool 17 is formed with a projection or eccentrically-mounted finger 16, adapted to enter the reduced portion of the socket 14, produced by the shoulder 16.

An important feature of this invention is the means by which the bur or other tool 17 is prevented from slipping out of place after it has been inserted in the socket 14. This means preferably consists in a spring 18, which is mounted in a groove or recess 19, formed in the contracted end or head portion of the casing 2 and extending longitudinally thereof. The said spring 18 is secured in position by means of a screw 20, which passes through the end of the spring, as at 21, and engages the material of the casing-head, as clearly illustrated in Fig. 1. The spring is free to vibrate except at the end which is secured by the said screw 20. The said screw also passes through the removable head-casing or cap 22, so that the end of the screw may be reached from without the casing for removal or replacement at any time. By this arrangement also the screw 20 is in position to prevent the turning of the cap or head-casing 22, so that it is locked in place, the said cap being provided with internal threads at its inner end 23, which engage corresponding threads 24, formed upon the reduced portion of the casing 2. The outer free end of the spring 18 is preferably turned inwardly at right angles to the body portion thereof, forming a retaining end 25. The bur or other tool 17 is provided with an annular groove 26, which is located at a proper distance from the end of the bur to reach a point opposite the end 25 of the spring 18 when the said bur is inserted in the socket 14. The action of the spring 18 is such that the retaining end portion 25 will normally be sprung into the annular groove 26 and prevent the longitudinal outward movement of the bur or tool.

Although the spring 18 may be positively moved to one side, as will be hereinafter described, for permitting of the insertion of the bur or tool, I generally form the retaining end 25 with a beveled portion 27, the bevel being upon the outer surface of said retaining end, so that when the bur or tool is thrust inwardly through the aperture 28 in the cap 22 it will engage the inclined or beveled face 27 and force the end of the spring 18 to one side. As soon as the annular groove 26 arrives opposite the retaining end 25 said end will be snapped into the said groove by the action of the spring.

The tool or bur 17 cannot be withdrawn from its seat in the end of the spindle without first moving the spring 18 to one side and disengaging the retaining end 25 thereof from the annular groove 26. In order to make it possible to move the said spring 18 for this purpose, I provide the same at some point intermediate its length with an actuating projection 29, which can be reached through an opening or slot 30, formed opposite thereto in the cap 22. The projection 29 is preferably made in the form of a ring or curved piece, as illustrated in Fig. 7. This ring or curved piece extends from the spring 18, to which it is rigidly attached, around the bored portion of the contracted end 3 of the casing 2. An annular groove 31 is formed in the said contracted end of the casing to accommodate the small amount of movement necessary in the ring 29 for the said ring to vibrate the spring 18 sufficiently to permit the removal of the bur or other dental tool. There is sufficient room between the cap 22 and the bottom of the groove 19, within which the spring 18 is secured, for the said spring to move to a sufficient extent to permit the insertion and removal of the bur or other tool. The casing 2 and the spindle 1 terminate at a point just short of the inwardly-turned gripping end of the spring 18. The said end 25 moves in the space between the end of the spindle and casing and the outer apertured end of the cap 22. The slot 30 in the cap 22 is usually elongated transversely of the casing, so that the thumb or finger nail of the operator may readily enter the same for depressing the ring or projection 29 of the spring 18.

In using the handpiece, when it is desired to insert a bur or other dental tool in place, it is only necessary to thrust the end thereof through the aperture 28 against the inclined or beveled face of the retaining projection 25, forcing the end of the tool past the same and seating it in the socket 14. The end of the spring will snap into the annular groove 26. The bur or tool 17 will thus be held against longitudinal movement, and as the engagement of the finger 15 with the shoulder 16 prevents rotation of said tool independently of the spindle 1 rotation of said spindle will rotate said bur 2. When the bur is to be removed, the operator presses upon the projection or ring 29, forcing the free end of the spring 18 toward the inner face of the cap 22. This operates to move the retaining end 25 of the spring far enough to one side to permit of the withdrawal of the bur or tool.

It will be observed that although the spring 18 is in position to positively lock the bur or other tool from being withdrawn from the handpiece it has no movement with the spindle, but remains stationary with the outer casing 2. As above intimated, the mounting of the spring 18 is such that the securing set-screw 20 is capable of locking the cap 22 is place as well as of holding the spring 18 in its recess or socket. The sole function of the spring 18 is the holding of the bur or tool against longitudinal movement, and the spindle 1 is prevented from engaging or wearing the end of the spring by reason of its mounting in the outer casing, the end-thrust bearings at each end of the enlarged portion of the spindle preventing any longitudinal movement thereof in the casing 2.

Having thus described my invention, what I claim as new, and desire to secure by Letters Patent, is—

1. A dental handpiece, comprising a casing, a rotary spindle arranged therein, a longitudinally-removable tool engaging the said spindle, a spring engaging the said casing and also engaging the spindle for preventing longitudinal movement thereof, a cap threaded onto said casing and inclosing said spring and means connecting the spring with the cap whereby the cap is prevented from rotating by the engagement of the spring with the casing.

2. A dental handpiece, comprising a casing, a rotary spindle arranged therein, a tool engaging said spindle and longitudinally removable therefrom, a groove being formed longitudinally in said casing, a spring lying within the longitudinal groove and formed with means engaging said tool for normally preventing longitudinal movement thereof, a cap threaded onto said casing inclosing said spring, and connections between the spring and cap for preventing rotation of the cap independently of the casing.

3. A dental handpiece, comprising a casing, a spindle mounted therein and formed with a tool-supporting socket, a tool extending into said socket, a spring for locking the tool in the socket and means for rigidly securing one end of the spring to the casing.

4. A dental handpiece, comprising a spindle having a tool-carrying socket formed therein, a tool extending into said socket and formed intermediate its length with an annular depression, a casing inclosing the spindle and producing thrust-bearings therefor, a spring secured rigidly to said casing at one end and at its free end extending opposite the annular depression in the tool for retaining the tool normally against longitudinal movement.

5. A dental handpiece, comprising a tool-carrying spindle, a casing for inclosing the same, a tool engaging said spindle, a locking-spring rigidly secured to the casing at one end, having its free end turned inwardly to engage said tool for retaining the same in place, and means projecting beyond the casing for moving the spring to one side for releasing the tool.

6. A dental handpiece, comprising a spindle, a casing inclosing the same, a tool carried by said spindle, a spring secured to the casing at one side of the spindle and engaging the tool for normally retaining the same in place, and means projecting from the spring and encircling the spindle-casing and extending beyond the spindle on the opposite side from the spring for releasing the spindle from its engagement with the tool.

7. A dental handpiece, comprising a spindle having a reduced, tool-carrying, socketed end, an annularly-grooved tool arranged therein, a casing forming bearings for the spindle and inclosing the same, said casing having a recess to receive the locking-spring, a locking-spring arranged therein and having an enlarged end, a screw securing said enlarged end within said casing, the free end of the spring having an inturned, beveled end adapted to engage the groove of the tool for normally retaining the same in the socket of said spindle, and means projecting from the spring and extending on the opposite side of the spindle for moving the spring to one side for facilitating release of the tool.

8. A dental handpiece comprising a casing having a head portion formed with an internal bearing, a spindle extending through said bearing, a spring mounted in the head, a projection for moving the spring, said projection surrounding the spindle-bearing and extending to the opposite side of the head from the spring, a cap fitting upon the head and provided with a slot opposite the said projection and a set-screw for holding the spring in place, the said set-screw also locking the cap in position.

9. A dental handpiece comprising a casing having a spindle-bearing formed therein, a spindle mounted in the casing and engaging the said bearing, a tool-gripping spring mounted in the casing and a ring formed upon the spring for vibrating the same, the said ring extending around the bearing and the spindle so that by pressing upon the ring the spring may move away from the spindle.

In testimony whereof I affix my signature in presence of two witnesses.

CHESTER M. FREEMAN.

Witnesses:
S. FRASER,
S. L. RIDEOUT.